US012631064B2

(12) United States Patent
Weston et al.

(10) Patent No.: US 12,631,064 B2
(45) Date of Patent: May 19, 2026

(54) SYSTEMS AND METHODS FOR MOVING A VEHICLE TAILGATE

(71) Applicant: Ford Global Technologies, LLC, Dearborn, MI (US)

(72) Inventors: Keith Weston, Canton, MI (US); Brendan Diamond, Naples, FL (US); Jonathan Hair, Northville, MI (US); John Robert Van Wiemeersch, Novi, MI (US); Stuart C. Salter, White Lake, MI (US)

( * ) Notice: Subject to any disclaimer, the term of this patent is extended or adjusted under 35 U.S.C. 154(b) by 83 days.

(21) Appl. No.: 18/645,750

(22) Filed: Apr. 25, 2024

(65) Prior Publication Data

US 2025/0333996 A1 Oct. 30, 2025

(51) Int. Cl.
| | |
|---|---|
| *E05F 15/75* | (2015.01) |
| *B60Q 5/00* | (2006.01) |
| *B60Q 9/00* | (2006.01) |
| *B60R 3/02* | (2006.01) |
| *E05F 15/611* | (2015.01) |
| *E05F 15/77* | (2015.01) |
| *G01G 19/12* | (2006.01) |

(52) U.S. Cl.
CPC ............ *E05F 15/75* (2015.01); *E05F 15/611* (2015.01); *E05F 15/77* (2015.01); *G01G 19/12* (2013.01); *B60Q 5/005* (2013.01); *B60Q 9/00* (2013.01); *B60R 3/02* (2013.01); *E05Y 2400/554* (2013.01); *E05Y 2400/81* (2013.01); *E05Y 2900/544* (2013.01)

(58) Field of Classification Search
CPC ......... E05F 15/75; E05F 15/611; E05F 15/77; G01G 19/12; B60Q 5/005; B60Q 9/00; B60R 3/02; E05Y 2400/554; E05Y 2400/81; E05Y 2900/544

See application file for complete search history.

(56) References Cited

U.S. PATENT DOCUMENTS

| | | | |
|---|---|---|---|
| 8,606,467 | B2 | 12/2013 | Gehin |
| 8,838,333 | B2 | 9/2014 | Cheal et al. |
| 11,384,590 | B2 | 7/2022 | Zarders et al. |
| 2002/0074959 | A1* | 6/2002 | Van Wiemeersch .... E05F 15/43 |
| | | | 318/445 |

(Continued)

FOREIGN PATENT DOCUMENTS

| | | | |
|---|---|---|---|
| DE | 102013007978 B4 | 9/2016 | |
| KR | 20050021159 A * | 3/2005 | |
| WO | WO-0114167 A1 * | 3/2001 | ............ B60P 1/4471 |

OTHER PUBLICATIONS

English translation of Kim (KR 20050021159) (Year: 2005).*

(Continued)

*Primary Examiner* — Abby J Flynn
*Assistant Examiner* — Kyle J Kingsland
(74) *Attorney, Agent, or Firm* — Frank Lollo; Eversheds Sutherland (US) LLP

(57) ABSTRACT

A vehicle including a tailgate, a sensor system, and a processor is disclosed. The sensor system may be configured to capture inputs associated with the tailgate. The processor may be configured to obtain a trigger signal, and determine an object presence on the tailgate based on the inputs obtained from the sensor system responsive to obtaining the trigger signal. The processor may further prevent a tailgate movement responsive determining the object presence.

20 Claims, 7 Drawing Sheets

(56) References Cited

U.S. PATENT DOCUMENTS

| | | | | |
|---|---|---|---|---|
| 2017/0204651 | A1 * | 7/2017 | Gussen | .................. E05F 15/77 |
| 2021/0039722 | A1 * | 2/2021 | Williamson | ........... B62D 33/03 |
| 2022/0056741 | A1 * | 2/2022 | Williams | .............. E05C 17/006 |
| 2022/0316259 | A1 | 10/2022 | Pulikonda et al. | |
| 2022/0412150 | A1 | 12/2022 | Johansson et al. | |

OTHER PUBLICATIONS

English translation of Lamort (WO 0114167) (Year: 2001).*
Zhuozheng Tang , et. al., Auto Tailgate Automatic Control System Based on Single Chip Microcomputer, Scientific Journal of Intelligent Systems Research, Apr. 15, 2021, pp. 144-152, vol. 3 Issue 4.

* cited by examiner

SYSTEMS AND METHODS FOR MOVING A VEHICLE TAILGATE

FIELD

The present disclosure relates to systems and methods for moving a vehicle tailgate between an open position and a closed position.

BACKGROUND

A vehicle user may move a vehicle tailgate between a closed position and an open position based on user's requirements. For example, the user may move the tailgate to the open position when the user requires to access the vehicle bed. The vehicle user may further move the tailgate to the closed position when the user may be driving the vehicle and/or may not require to access the vehicle bed.

The user may move the tailgate between the open and closed positions by manually moving the tailgate or via automatic means. The automatic means may include, for example, actuating a dedicated button/actuator on the tailgate or a vehicle interior portion and transmitting a tailgate movement command to the vehicle via a user device, a vehicle Human-Machine Interface (HMI), a key fob, and/or the like. Such automated means for enabling the tailgate movement enhance user's convenience of operating the tailgate.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
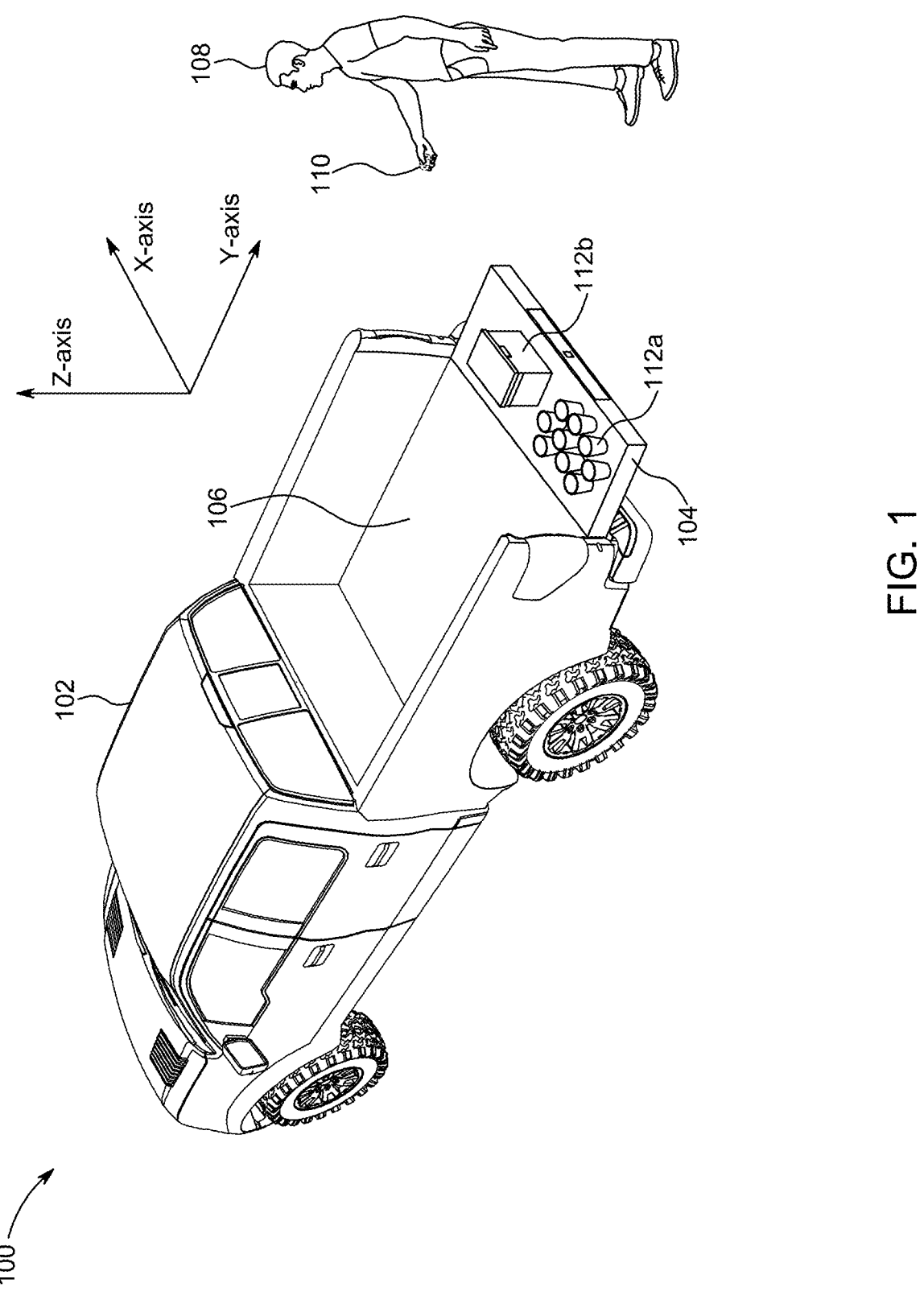
FIG. 1 depicts an environment in which techniques and structures for providing the systems and methods disclosed herein may be implemented.

The present disclosure describes a vehicle that may be configured to determine if an object may be placed on or leaning against a vehicle tailgate when a user requests a tailgate movement and timely alert the user about the object presence. The vehicle may cause the tailgate movement when the user confirms that the object is removed from the tailgate, or when the user decides to override the alert output by the vehicle.

The tailgate may be configured to move between an open position and a closed position, and the user may request the vehicle to move the tailgate from the open position to the closed position, or vice-versa. The vehicle may include a sensor system including one or more vehicle cameras, radio detection and ranging (radar) sensors, light detection and ranging (lidar) sensors, and/or the like, which may be configured to capture one or more tailgate images. The sensor system may further include an object weight detection unit that may be configured to determine the weight associated with an object that may be placed on the tailgate.

Responsive to receiving a user request to move the tailgate, the vehicle may obtain the inputs from the sensor system and determine the object presence on the tailgate based on the obtained inputs. The vehicle may then prevent or delay the tailgate movement, and output an alert notification via a user device, a vehicle Human-Machine Interface (HMI), and/or the like, indicating to the user that an object may be placed on the tailgate. Responsive to viewing/hearing the alert notification, the user may either remove the object from the tailgate or may decide to override the alert. The user may then provide a user input or user confirmation to the vehicle, indicating to the vehicle that the tailgate may now be moved. Responsive to obtaining the user input or the user confirmation, the vehicle may move the tailgate according to the user request.

In some aspects, in addition to outputting the alert notification, the vehicle may also output information associated with the object weight detected by the object weight detection unit, for user's reference and convenience.

In additional or alternative aspects, responsive to receiving the user request to move the tailgate, the vehicle may cause a predefined small tailgate movement "upwards" (e.g., away from ground or against the gravity) when the tailgate may be in the open position and the user request may be for moving the tailgate to the closed position. In some aspects, the vehicle may cause the predefined small tailgate movement such that the object (if placed on the tailgate) may not move or fall from the tailgate. Responsive to causing the predefined small tailgate movement, the vehicle may determine a tailgate motor torque required to cause the predefined small tailgate movement and estimate a tailgate weight based on the tailgate motor torque. The vehicle may further compare the estimated tailgate weight with a predefined tailgate weight (information of which may be pre-stored in a vehicle memory) and determine the object presence on the tailgate when a difference between the estimated tailgate weight and the predefined tailgate weight may be non-zero or greater than a predefined threshold value. In some aspects, the determined difference may be associated with the object weight. Responsive to determining the object presence and the object weight, the vehicle may output the alert notification and the object weight, as described above. In some aspects, the vehicle may determine and output the object weight when the user transmits (via the user device or vehicle HMI) a request to the vehicle to seek the object weight.

The present disclosure discloses a vehicle that is configured to determine a presence of an object on the tailgate and alert the user about the object presence before causing the tailgate movement. Since the user is alerted about the object presence, the user may remove the object from the tailgate before the tailgate is moved, thereby preventing any adverse situation associated with the tailgate and/or the object. The vehicle may efficiently detect even small or lightweight objects that may be placed on the tailgate, thereby preventing the objects from falling off the tailgate when the tailgate moves. Further, the vehicle enables the user to conveniently weigh one or more objects on the tailgate if the user desires to weigh the objects, without requiring to use any external weighing scales or weight measurement units.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that include a tailgate 104 and a vehicle bed 106. The vehicle 102 may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode and may include any powertrain such as a gasoline engine, one or more electrically-actuated motor(s), a hybrid system, etc.

Figure 3:
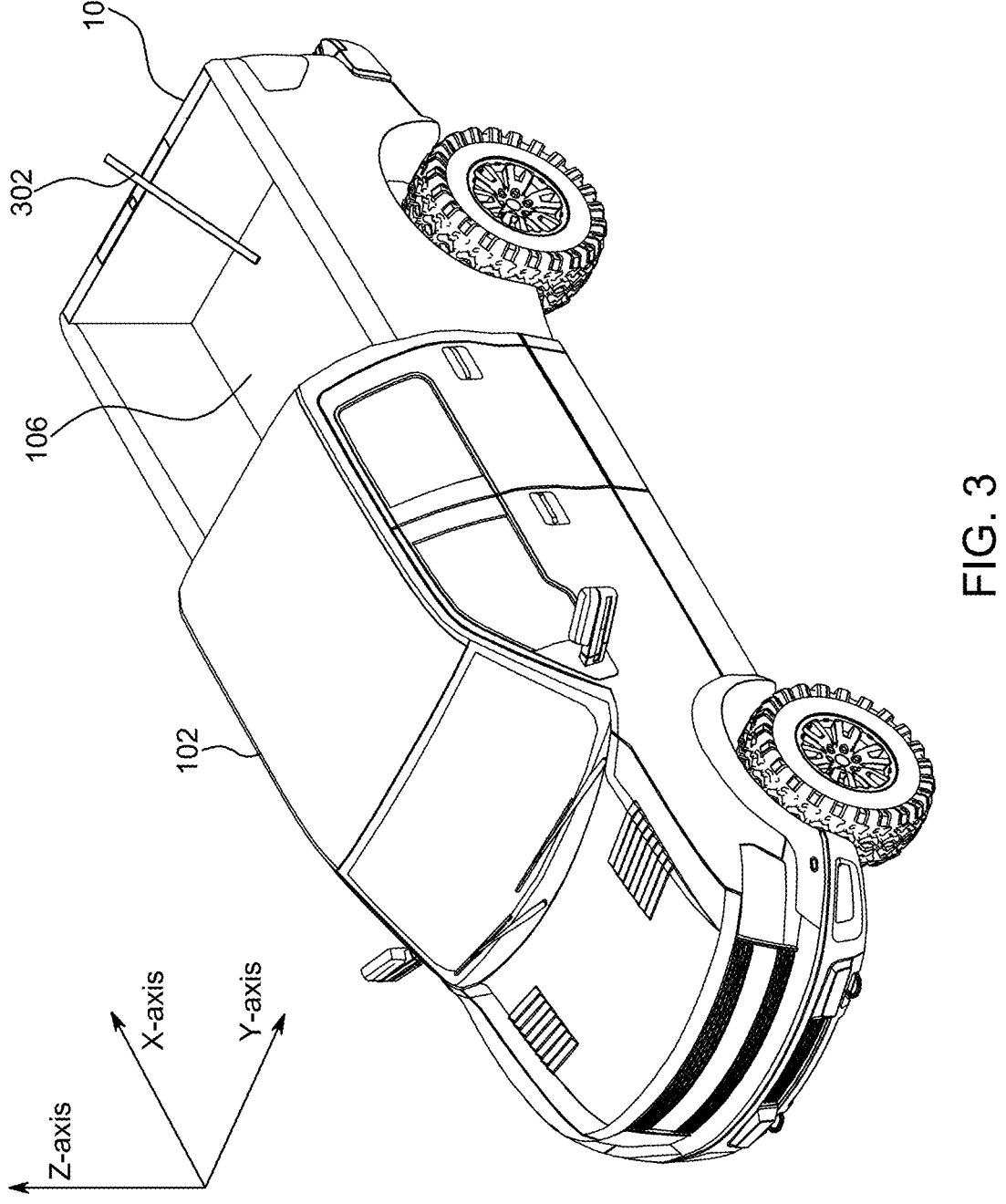
FIG. 3 depicts a tailgate in a closed position in accordance with the present disclosure.

The tailgate 104 may be disposed at a vehicle rear portion and may be configured to move between an open position (as shown in FIG. 1) and a closed position (as shown in FIG. 3). In some aspects, the tailgate 104 may be in the closed position when a tailgate plane may be perpendicular to a vehicle bed plane, and the tailgate 104 may be in the open position when the tailgate plane may be parallel to the vehicle bed plane. For example, as shown in FIG. 1, the tailgate plane and the vehicle bed plane are in the X-Y plane when the tailgate 104 is in the open position. Further, as shown in FIG. 3, the tailgate plane is in the X-Z plane, while the vehicle bed plane is in the X-Y, when the tailgate 104 is in the closed position.

In some aspects, a vehicle user 108 may cause a tailgate movement between the closed position and the open position by manually moving the tailgate 104. The user 108 may move the tailgate 104 to the open position when the user 108 requires to access the vehicle bed 106 (e.g., to load or unload one or more items that may be placed on the vehicle bed 106). Further, the user 108 may move the tailgate 104 to the closed position when the user 108 requires to drive the vehicle 102 and/or when the user 108 may not require to access the vehicle bed 106.

In other aspects, the user 108 may cause the tailgate movement between the closed position and the open position via automated means. For example, the user 108 may move the tailgate 104 to the closed position from the open position (or vice-versa) by pressing/actuating a dedicated tailgate button/actuator that may be disposed on the tailgate 104 or a vehicle interior portion. Responsive to the user 108 pressing the button, the vehicle 102 may initiate a tailgate movement process to cause the tailgate movement from the open position to the closed position (or vice-versa). In additional aspects, the user 108 may move the tailgate 104 to the closed position from the open position (or vice-versa) by wirelessly transmitting a tailgate movement command to the vehicle 102 via a user device (shown as user device 204 in FIG. 2), a vehicle Human-Machine Interface (HMI)/ infotainment system, a phone or a key fob 110 or a remote user device. The vehicle 102 may initiate the tailgate movement process responsive to receiving the tailgate movement command from the user device, the infotainment system, the phone or the key fob 110.

In some aspects, the vehicle 102 may cause the tailgate movement from the open position to the closed position (or vice-versa) responsive to receiving the tailgate movement command or detecting the user press on the tailgate button, when the vehicle 102 determines that the tailgate 104 may be clear of any obstructions or objects. Specifically, the vehicle 102 may not cause the tailgate movement or may delay the tailgate movement, when the vehicle 102 detects a presence of one or more objects (e.g., a cup 112a, a box 112b, etc., collectively referred to as object 112) on the tailgate 104, as shown in FIG. 1. A person ordinarily skilled in the art may appreciate that the tailgate movement may not be efficient or may be interrupted when the object 112 may be present on the tailgate 104 and the tailgate 104 is made to move between the open and closed positions responsive to receiving a user request to move the tailgate 104. Further, if the tailgate 104 is made to move in such a scenario, the object 112 may fall from the tailgate 104 and/or may get in a suboptimal condition.

In some aspects, the vehicle 102 may detect the object presence on the tailgate 104 based on one or more tailgate images that may be captured by vehicle's interior and/or exterior cameras, a radio detection and ranging (radar) sensor, a light detection and ranging (lidar) sensor, and/or the like. In further aspects, the vehicle 102 may detect the object presence on the tailgate 104 by estimating an object weight associated with the object 112 and determining that the object 112 may be present on the tailgate 104 when the object weight may be greater than a predefined threshold value. In this case, responsive to receiving the user request to move the tailgate 104, the vehicle 102 may cause a predefined small tailgate movement "upwards" away from the ground, or from the open position to the closed position. The vehicle 102 may cause the predefined small tailgate movement such that the object 112 (if present on the tailgate 104) does not move or does not fall from the tailgate 104. Responsive to causing the predefined small tailgate movement, the vehicle 102 may determine a tailgate motor torque required to cause the predefined small tailgate movement. The vehicle 102 may further estimate a tailgate weight (including the object weight associated with the object 112 that may be present on the tailgate 104) based on the determined tailgate motor torque. The vehicle 102 may determine the object presence on the tailgate 104 when the estimated tailgate weight may be greater than a predefined tailgate weight (information of which may be pre-stored in a vehicle memory).

A person ordinarily skilled in the art may appreciate that if the estimated tailgate weight is greater than the predefined tailgate weight, a difference between the two weights may be due to the object presence on the tailgate 104 and may be associated with the object weight. For example, if the box 112b and the cups 112a weigh 1.5 lbs., the difference between the estimated tailgate weight and the predefined tailgate weight may be equivalent to 1.5 lbs.

In additional or alternative aspects, the vehicle 102 may include an object weight detection unit (shown as object weight detection unit 234 in FIG. 2) that may be configured to determine the object weight associated with the object 112 that may be placed on the tailgate 104. The vehicle 102 may determine the object presence on the tailgate 104 when the object weight on the tailgate 104 detected by the object weight detection unit may be greater than zero or the predefined threshold value described above. In some aspects, the object weight detection unit may be a weighing scale incorporated into a tailgate surface or a tailgate bedliner. In other aspects, the object weight detection unit may be one or more straps with strain gages attached to the tailgate 104. In some aspects, the vehicle 102 may determine the object weight by using the object weight detection unit when the user 108 requests the vehicle 102 to determine the object weight, and may not determine the object weight otherwise. In this case, the vehicle 102 may determine the object presence on the tailgate 104 based on the tailgate images and/or by causing the predefined small tailgate movement, as described above.

Responsive to determining the object presence on the tailgate 104 as described above, the vehicle 102 may prevent the tailgate movement. The vehicle 102 may further output an alert notification via the user device, a vehicle Human-Machine Interface (HMI), a vehicle speaker, a vehicle horn, one or more vehicle lights, etc., indicating to the user 108 that the tailgate 104 should not be moved till the object 112 is cleared or removed from the tailgate 104.

The user 108 may remove the object 112 from the tailgate 104, responsive to viewing/hearing the alert notification. The user 108 may then transmit a confirmation signal to the vehicle 102, via the user device, the vehicle HMI, the key fob 110, and/or the like, confirming to the vehicle 102 that the object 112 is removed and hence the tailgate 104 may be moved. In some aspects, the user 108 may decide to override the alert notification and may still transmit the confirmation signal, without removing the object 112 from the tailgate 104.

Responsive to obtaining the confirmation signal from the user 108, the vehicle 102 may move the tailgate 104 from the open position to the closed position (or vice-versa). In this manner, the vehicle 102 may facilitate in ensuring that the tailgate 104 is moved in an optimal manner, while at the same time ensuring that the object 112 placed on the tailgate 104 does not fall off the tailgate 104, and the user 108 is alerted about the object presence on the tailgate 104 in a timely manner.

Further vehicle details are described below in conjunction with FIG. 2.

The vehicle 102 and/or the user 108 implement and/or perform operations, as described here in the present disclosure, in accordance with the owner manual and safety guidelines. In addition, any action taken by the user 108 based on the notifications provided by the vehicle 102 should comply with all the rules specific to the location and operation of the vehicle 102 (e.g., Federal, state, country, city, etc.). The notifications, as provided by the vehicle 102, should be treated as suggestions and only followed according to any rules specific to the location and operation of the vehicle 102.

Figure 2:
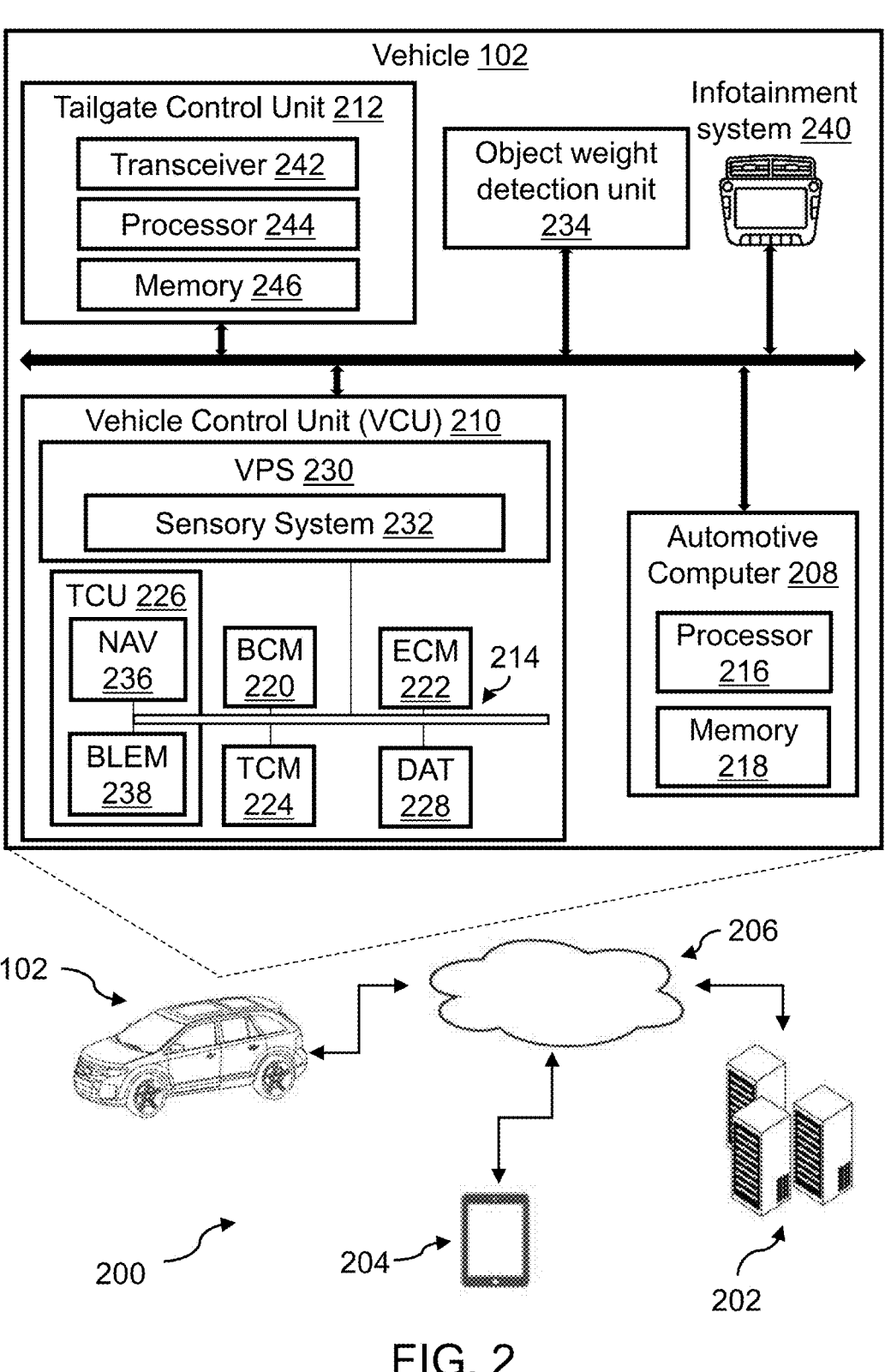
FIG. 2 depicts a block diagram of a system to enable a tailgate movement in accordance with the present disclosure.

FIG. 2 depicts a block diagram of a system 200 to enable a tailgate movement in accordance with the present disclosure. While describing FIG. 2, references will be made to FIGS. 3, 4, 5 and 6.

The system 200 may include the vehicle 102, one or more servers 202 (or a server 202), and a user device 204 communicatively coupled with each other via one or more networks 206. The server 202 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet. In further aspects, the server 202 may provide Artificial Intelligence/Machine Learning (AI/ML) based image processing algorithms to the vehicle 102, which may enable the vehicle 102 to analyze the images captured by one or more vehicle cameras, radar sensors, lidar sensors, and/or the like and determine the object presence on the tailgate 104. The server 202 may provide the AI/ML based image processing algorithms to the vehicle 102 at a predefined frequency, or when the vehicle 102 transmits a request to the server 202 to obtain such algorithms. Optionally, such algorithms may also be pre-stored on the vehicle 102 (e.g., in a vehicle memory) and may be updated periodically when the connection with the server 202 is available.

The user device 204 may be associated with the user 108 and may be, for example, a mobile phone, a computer, a laptop, a tablet, a smart wearable device, or any other device with communication capabilities.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a tailgate control unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a tailgate control program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 102 systems, connected servers (e.g., the server(s) 202), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 (or sensor system) may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, temperature sensors, wheel sensors, ambient weather sensors, vehicle internal and external cameras, one or more rain sensors, capacitive moisture sensors, etc. In some aspects, the vehicle sensory system 232 may be configured to capture inputs associated with the tailgate 104. For example, the vehicle sensory system 232 may be configured to capture one or more tailgate images, via the vehicle's interior or exterior cameras, one or more radar sensors, lidar sensors, and/or the like.

In some aspects, the vehicle sensory system 232 may further include an object weight detection unit 234 that may be disposed in or on the tailgate 104 and may be configured to determine an object weight of an object (e.g., the object 112) that may be placed on the tailgate 104 or hung from the tailgate 104. In some aspects, the object weight detection unit 234 may be part of the vehicle sensory system 232. In other aspects, the object weight detection unit 234 may be a separate unit in the vehicle 102, different from the vehicle sensory system 232.

Figure 4:
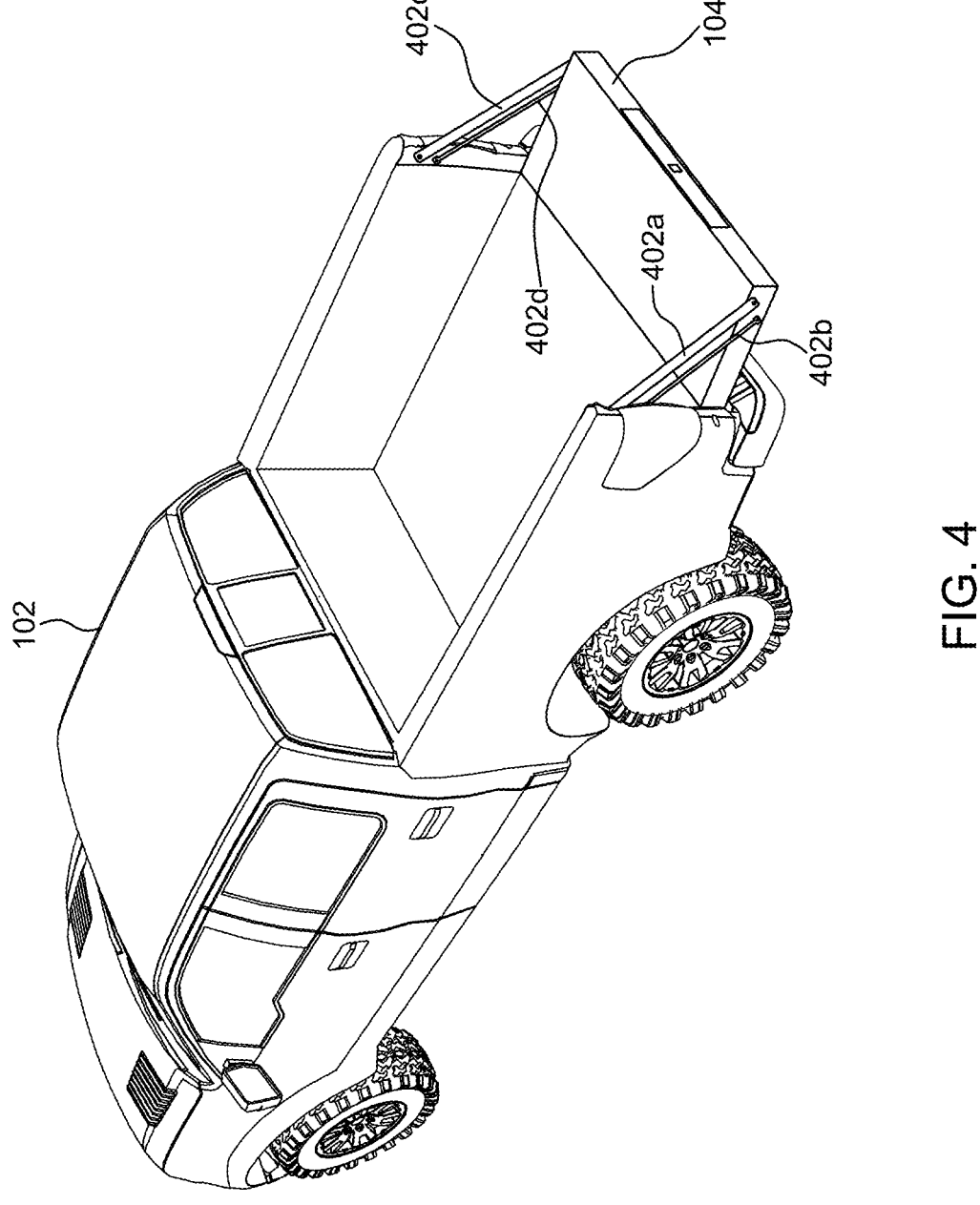
FIG. 4 depicts a view an object weight detection unit in accordance with the present disclosure.

In one exemplary aspect, the object weight detection unit 234 may include one or more straps 402a, 402b, 402c, 404d (collectively referred to as straps 402) that may be attached to the tailgate 104, as shown in FIG. 4. The straps 402 may include strain gages that may be configured to determine the object weight when the tailgate 104 may be in the open position and the object 112 may be placed on the tailgate 104 or hung from the tailgate 104. In some aspects, the strain gages may be incorporated into one or more existing tailgate motion limiting cables. In other aspects, the strain gages may be part of external straps or cables that may be removably attached to the tailgate 104.

The straps 402 may be communicatively coupled with the VCU 210, the automotive computer 208 and/or the unit 212 and may be configured to output the determined object weight to these units. The straps 402 may also output the determined object weight to external devices/systems (e.g., the user device 204, the server 202, etc.), via the units described above.

In some aspects, the object weight detection unit 234 may include two cables on each side of the tailgate 104 (as shown in FIG. 4), one with a strain gage and one a retainer cable. If the retainer cable is removed, only the strain gage would be in series. In an exemplary aspect, the strain gage may have a short stop loop that stops the tailgate 104 from going too far past 180 degrees.

In alternative or additional aspects, the object weight detection unit 234 may include a weighing scale that may be incorporated into a tailgate surface or a tailgate bedliner.

Figure 5:
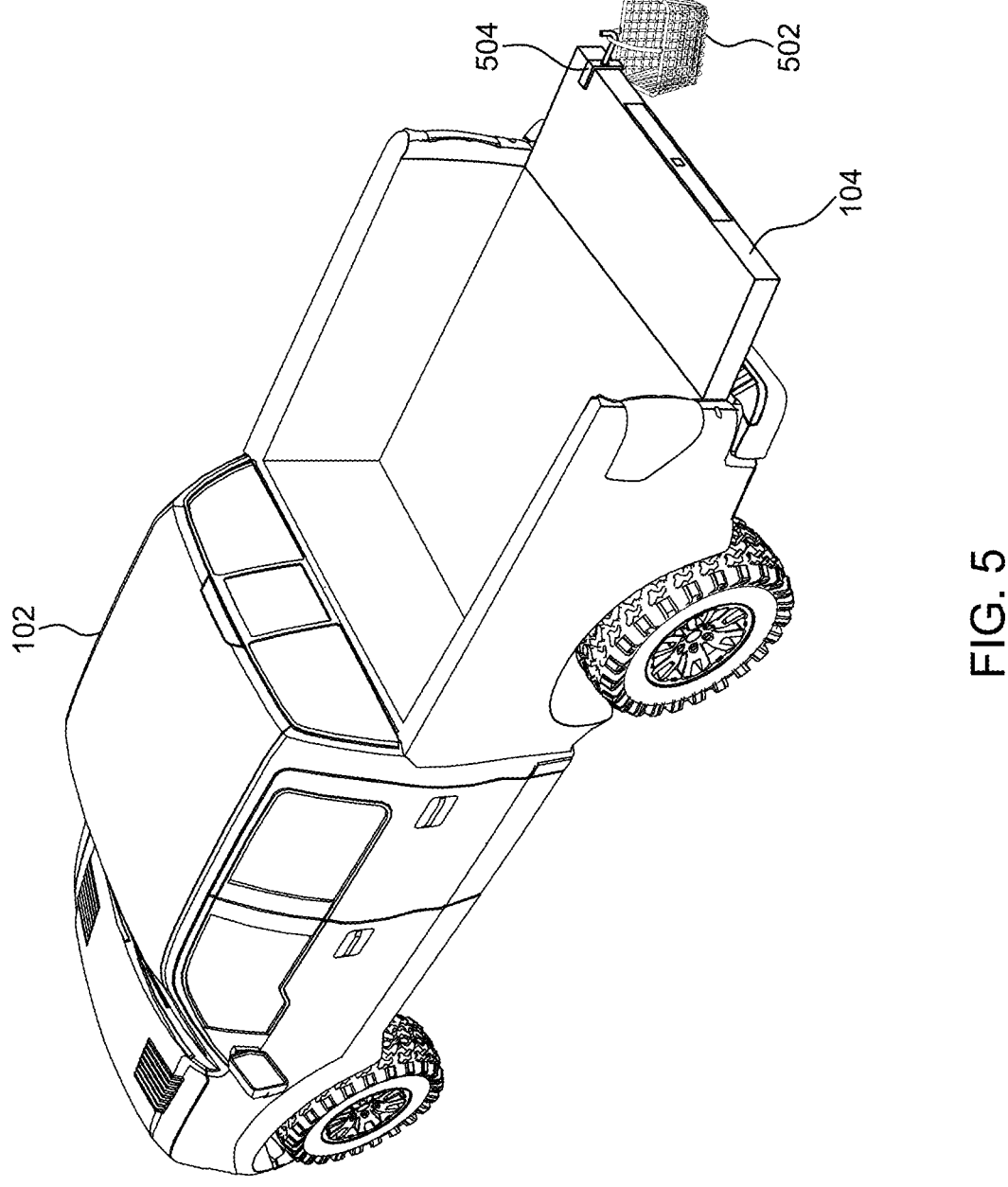
FIG. 5 depicts a view of a basket connected to a tailgate in accordance with the present disclosure.

The object weight detection unit 234 may provide several benefits to the user 108. For example, as shown in FIG. 5, the user 108 may hang a basket 502 from a tailgate clamp system 504 (that may be integrated to the tailgate 104 or externally attached to the tailgate 104) and place one or more objects (not shown) in the basket 502 that the user 108 may desire to weigh. In this case, the object weight detection unit 234 may determine and output the weight of the objects placed in the basket 502, thus enabling the user 108 to conveniently weigh the objects. In an exemplary aspect, the user 108 may use the object weight detection unit 234 in this manner to weigh nails/screws/fasteners that the user 108 may be buying by weight, to weigh drywall compound, concrete, fish, and/or the like. In some aspects, vendors who bill customers by weight may also use this feature to invoice customers in an efficient manner. In an exemplary aspect, the user 108 may use the object weight detection unit 234 to weigh objects, as described above, by transmitting a request to the vehicle 102 to weigh the objects. Stated another way, the object weight detection unit 234 may not unnecessarily output the object weight, unless the user 108 desires to know about the object weight.

Figure 6:
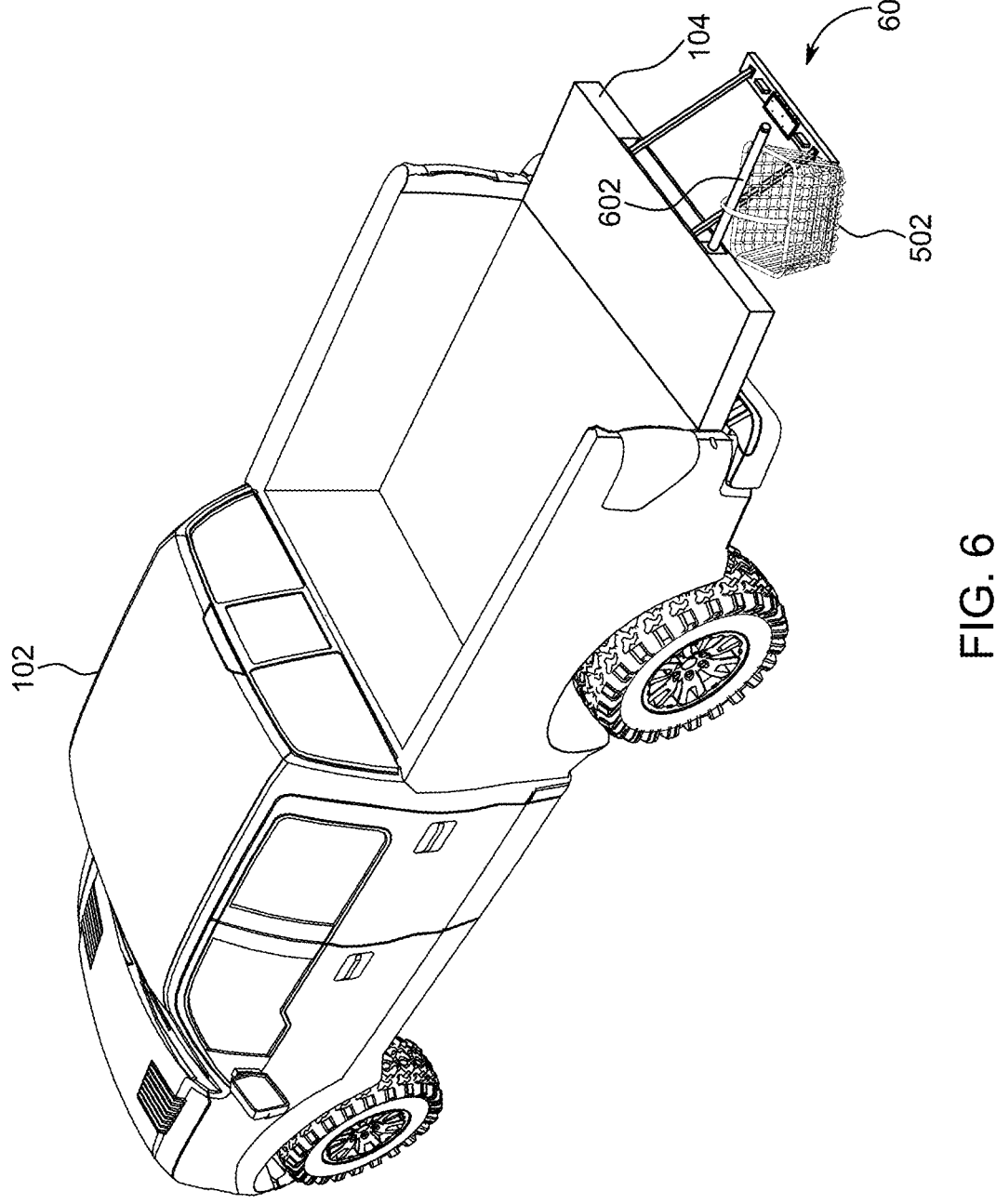
FIG. 6 depicts a view of a basket connected to a support rod in accordance with the present disclosure.

FIG. 5 depicts an example aspect where the basket 502 is hung from the tailgate clamp system 504 that may be disposed on existing clamp locations on the tailgate 104. The present disclosure is not limited to such an aspect. In additional or alternative aspects, as shown in FIG. 6, the user 108 may hang the basket 502 on a support rod 602 associated with an existing step support structure 604 of the vehicle 102 and use the object weight detection unit 234 to determine the weight of the objects placed in the basket 502 in the same manner as described above. In some aspects, the user 108 may hang the basket 502 to the support rod 602 when the support rod 602 may be in a horizontal position parallel to the ground.

A person ordinarily skilled in the art may appreciate that the torque (and hence the object weight detected by the object weight detection unit 234) may vary significantly depending on whether the basket 502 is at the very end of the support rod 602 or at the edge of the tailgate 104. Therefore, to accurately determine the object weight, it may be important to know about or estimate the moment.

In some aspects, to ensure that the object weight is determined accurately by the object weight detection unit 234, the user 108 may be requested or mandated (e.g., by outputting a notification) by the vehicle 102 to place the basket 502 at a predefined precise point on the support rod 602 (or otherwise on the tailgate 104). In further aspects, a resistive or capacitive strip may be provided on the support rod 602 to pin-point the predefined precise point. In other aspects, demarcations or dents may be provided on known location(s) on the support rod 602 onto which the user 108 may hang or rest the basket 502.

In alternative or additional aspects, a hook and/or a marking may be provided on the support rod 602 at which the user 108 may hang the basket 502. In another exemplary aspect, the support rod 602 may be slidable, and may include a hook at the end at which the user 108 may hang the basket 502. In this case, the support rod 602 may slide out, and the vehicle 102 may automatically measure the support rod radius by determining how far the support rod 602 is extended or slid out. Further, in this case, the support rod 602 can either be fully tucked against the tailgate 104 or fully extended. A switch may be used by the vehicle 102 to detect the rod position. The object weight detection unit 234 may then accurately determine the object weight based on the support rod radius or whether the support rod 602 is fully extended or tucked.

In yet another exemplary aspect, the user 108 may transmit/provide the information associated with the support rod radius to the vehicle 102, so that the object weight detection unit 234 may accurately determine the object weight.

In some aspects, the tailgate movement may be disabled when the user 108 may be weighing objects in the manner described above.

In some aspects, the VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 236 for receiving and processing a GPS signal, a BLE Module (BLEM) 238, a Wi-Fi transceiver, a UWB transceiver, and/or other wireless transceivers (not shown in FIG. 2) that may be configurable for wireless communication (including cellular communication) between the vehicle 102 and other systems (e.g., the key fob 110), computers, and modules. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), headlights, audio system(s), speakers, wipers, the tailgate 104, door locks and access control, and various comfort controls. The BCM 220 may also operate as a gateway for bus and network interfaces to interact with remote ECUs (not shown in FIG. 2). In some aspects, the BCM 220 may be configured to cause the tailgate movement between the closed position and the open position based on command signals obtained from the processor 216, the unit 212, the user device 204 and/or the server 202.

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 240 (or a vehicle Human-Machine Interface (HMI)). The infotainment system 240 may include a touchscreen interface portion and may include voice recognition features, biometric identification capabilities that can identify users based on facial recognition, voice recognition, fingerprint identification, or other biological identification means. In other aspects, the infotainment system 240 may be further configured to receive user instructions/inputs via the touchscreen interface portion, and/or display notifications, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the unit 212, regardless of whether it is integrated with the automotive computer 208 or the ECUs 214, or whether it operates as an independent computing system in the vehicle 102, may include a transceiver 242, a processor 244, and a computer-readable memory 246.

The transceiver 242 may be configured to receive information/inputs from one or more external devices or systems, e.g., the user device 204, the server(s) 202, and/or the like via the network 206. For example, the transceiver 242 may receive the AI/ML based image processing algorithms from the server(s) 202 via the network 206. Further, the transceiver 242 may transmit notifications (e.g., alert/alarm signals) to the external devices or systems. In addition, the transceiver 242 may be configured to receive information/inputs from vehicle 102 components such as the infotainment system 240, the vehicle sensory system 232, the object weight detection unit 234, and/or the like. Further, the transceiver 242 may transmit notifications (e.g., alert/alarm/command signals) to the vehicle 102 components such as the infotainment system 240, the BCM 220, etc.

The processor 244 and the memory 246 may be the same as or similar to the processor 216 and the memory 218, respectively. In some aspects, the processor 244 may be an AI/ML based processor that may utilize the memory 246 to store programs in code and/or to store data for performing aspects in accordance with the disclosure. The memory 246 may be a non-transitory computer-readable medium or memory storing the tailgate control code. In some aspects, the memory 246 may additionally store the AI/ML based image processing algorithms that the vehicle 102 may obtain from the server(s) 202. The memory 246 may further store the information associated with vehicle's structure, design, model, and/or the like. For example, the memory 246 may store information of the predefined tailgate weight that may be associated with the tailgate 104 (when no object may be placed on the tailgate 104). In some aspects, if the user 108 customizes the tailgate 104 or changes its inertial properties, the user 108 may adjust or modify the information associated with the predefined tailgate weight (via the user device 204, the infotainment system 240, and/or the like) according to the customized tailgate design/structure. In some aspects, the predefined tailgate weight may incorporate correction for outside temperature and aging/wear over time associated with the tailgate 104 and/or the vehicle structure.

In operation, the processor 244 may obtain a trigger signal when the user 108 desires to move the tailgate 104 from the open position to the closed position, or from the closed position to the open position. In some aspects, the processor 244 may obtain the trigger signal from the user device 204, the key fob 110 or the infotainment system 240 when the user 108 provides a command to any of these devices/units to move the tailgate 104. In other aspects, the processor 244 may obtain the trigger signal from the dedicated tailgate actuator/button that may be disposed on the tailgate 104 or the vehicle interior portion. In this case, the processor 244 obtains the trigger signal when the user 108 presses the tailgate button. In yet another aspect, the processor 244 may obtain the trigger signal when the user 108 performs a predefined gesture in proximity to the vehicle 102 (as detected by the vehicle's cameras) or provides an audio/audible command (as detected by a vehicle microphone) to move the tailgate 104. In yet another aspect, the processor 244 may obtain the trigger signal when the user 108 attempts to manually move the tailgate 104 (as detected by the vehicle's cameras or detection of torque in the absence of a user or any vehicle-initiated command). In this case, the processor 244 may determine a user's intent to move the tailgate 104 by analyzing the user images captured by the vehicle cameras.

In some aspects, the trigger signal may be associated with a user request to move the tailgate 104 from the open position to the closed position, when the tailgate 104 may be in the open position (as shown in FIG. 1). In other aspects, the trigger signal may be associated with a user request to move the tailgate 104 from the closed position to the open position, when the tailgate 104 may be in the closed position (as shown in FIG. 3). The description below is provided in the context of the trigger signal being associated with the user request to move the tailgate 104 from the open position to the closed position; however, the same description is applicable for the user request to move the tailgate 104 from the closed position to the open position.

Responsive to obtaining the trigger signal, the processor 244 may obtain inputs from the vehicle sensory system 232 and/or the object weight detection unit 234. In some aspects, the inputs obtained from the vehicle sensory system 232 may include one or more tailgate images that may be captured by the vehicle cameras, radar sensors, lidar sensors, and/or the like. In further aspects, the inputs obtained from the object weight detection unit 234 may include the object weight associated with one or more objects (e.g., the object 112) that may be placed on the tailgate 104.

The processor 244 may determine the object presence on the tailgate 104 based on the inputs obtained from the vehicle sensory system 232 and/or the object weight detection unit 234. For example, when the inputs are the tailgate images captured by the vehicle cameras, radar sensors, lidar sensors, etc., the processor 244 may execute the AI/ML based image processing algorithms (that may be obtained from the server 202) on the tailgate images to determine the object presence on the tailgate 104. In some aspects, the processor 244 may determine the object presence on the tailgate 104 even when the object 112 may be small or lightweight.

As another example, when the inputs are associated with the object weight determined by the object weight detection unit 234, the processor 244 may determine the object presence on the tailgate 104 when the determined object weight may be non-zero or greater than a predefined threshold value.

In some aspects, in addition or alternative to obtaining the inputs from the vehicle sensory system 232 and/or the object weight detection unit 234, the processor 244 may cause a predefined small tailgate movement "upwards" responsive to obtaining the trigger signal, when the tailgate 104 may be in the open position and the trigger signal may be associated with the user request to move the tailgate 104 to the closed position. As described above in conjunction with FIG. 1, the predefined small tailgate movement "upwards" (i.e., away from the ground or against the force of gravity) may not cause the object 112 (if placed on the tailgate 104) to fall or even move from its location.

Responsive to causing the predefined small tailgate movement as described above, the processor 244 may determine a tailgate motor torque required to cause the predefined small tailgate movement. The processor 244 may obtain information associated with the tailgate motor torque from the VCU 210 and/or from a vehicle torque meter. The processor 244 may further estimate a tailgate weight based on the determined tailgate motor torque. The processor 244 may then compare the estimated tailgate weight with the predefined tailgate weight (information of which may be pre-stored in the memory 246) to determine a difference between the estimated tailgate weight and the predefined tailgate weight. In some aspects, the processor 244 may determine the object presence on the tailgate 104 when the difference described above is a non-zero value or greater than the predefined threshold value described above. In this case, the determined difference may be equivalent to the object weight (if the object 112 is placed on the tailgate 104).

The processor 244 may transmit a command signal to the BCM 220 to cause the tailgate movement from the open position to the closed position when the processor 244 does not determine the object presence on the tailgate 104 by using one or more methods described above. In this manner, the processor 244 causes the tailgate 104 to move from the open position to the close position when the processor 244 determines that the tailgate 104 is clear of any objects, and hence it may be not be needed to move the tailgate 104.

On the other hand, responsive to determining the object presence on the tailgate 104, the processor 244 may not cause or prevent the tailgate movement or may delay the tailgate movement. In this case, responsive to determining the object presence on the tailgate 104, the processor 244 may output an alert notification via the user device 204, a vehicle speaker, one or more vehicle lights (e.g., by flashing the vehicle's taillights, CHMSL lights, etc.), the infotainment system 240, and/or the like. The alert notification may indicate to the user 108 that the object 112 may be present on the tailgate 104, and hence the processor 244 may not move the tailgate 104.

In some aspects, responsive to viewing/hearing the alert notification, the user 108 may remove the object 112 from the tailgate 104 and then provide/transmit a user input or a user confirmation signal to the vehicle 102 via the user device 204, the key fob 110, the tailgate actuator/button, and/or by performing a predefined user gesture or providing an audio command, or by performing a predefined user movement pattern in proximity to the vehicle 102. In other aspects, the user 108 may decide to override the alert notification and may still provide the user input to the vehicle 102 without removing the object 112.

The processor 244 may obtain the user input from the user 108 and may cause the tailgate movement (e.g., via the BCM 220) from the open position to the closed position. In this manner, the processor 244 causes the tailgate 104 to move after informing the user 108 about the object presence on the tailgate 104, so that the user 108 may take timely remedial actions.

In alternative aspects, the processor 244 may not execute the process of determining the object presence on the tailgate 104, as described above. In this case, responsive to receiving the trigger signal, the processor 244 may directly output the alert notification and wait to receive the user's confirmation that the tailgate 104 is clear of any objects. The processor 244 may move the tailgate 104 when the user 108 confirms that the tailgate 104 is clear (i.e., no object is placed on the tailgate 104).

In further aspects, to enhance user's convenience, in addition or alternative to moving the tailgate 104 as described above, the processor 244 may output the object weight determined by the object weight detection unit 234 and/or determined via the calculated difference between the estimate tailgate weight and the predefined tailgate weight. The processor 244 may output the object weight on the user device 204 and/or the infotainment system 240. The processor 244 may also transmit, via the transceiver 242, information associated with the object weight to the server 202.

Although the description above is provided in the context of the trigger signal being associated with the user request to move the tailgate 104 from the open position to the closed position, the present disclosure is not limited to such an aspect. The processor 244 may follow a similar process as described above to determine an object presence on the tailgate 104 when the tailgate 104 may be in the closed position and the trigger signal is associated with the user request to move the tailgate 104 from the closed position to the open position. In this case, the processor 244 may determine if an object (e.g., an object 302, as shown in FIG. 3) may be leaning against the tailgate 104 and may fall off if the tailgate 104 is opened. In this case, responsive to determining the presence of the object 302, the processor 244 may output the alert notification and may move the tailgate 104 to the open position when the user 108 provides the input/confirmation, as described above.

Figure 7:
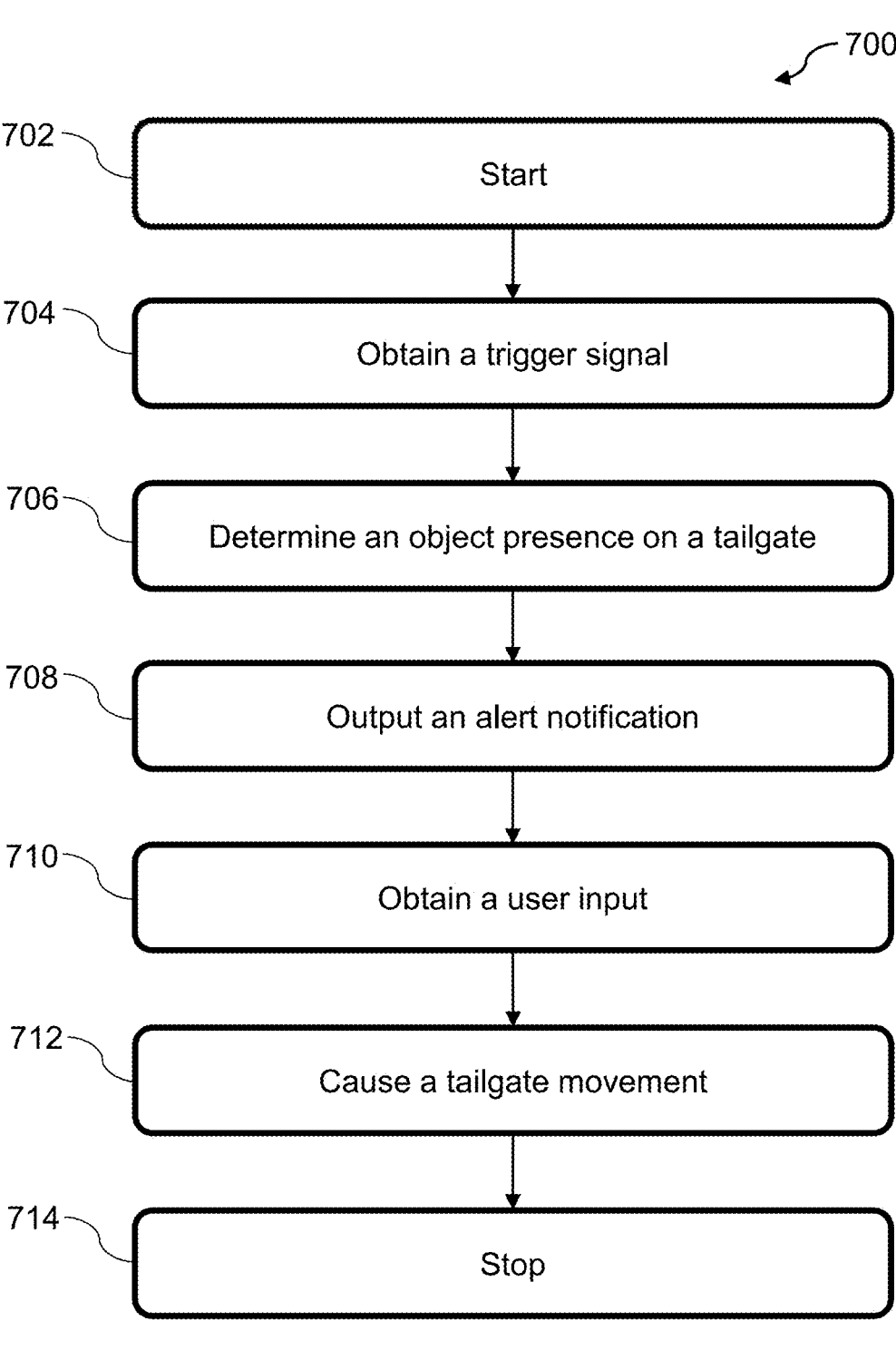
FIG. 7 depicts a flow diagram of a method to enable a tailgate movement in accordance with the present disclosure.

FIG. 7 depicts a flow diagram of a method 700 to enable a tailgate movement in accordance with the present disclosure. FIG. 7 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 700 starts at step 702. At step 704, the method 700 may include obtaining, by the processor 244, the trigger signal as described above. At step 706, the method 700 may include determining, by the processor 244, the object presence on the tailgate 104 based on the inputs obtained from the vehicle sensory system 232 and/or the object weight detection unit 234, responsive to obtaining the trigger signal. At step 708, the method 700 may include outputting, by the processor 244, the alert notification responsive to determining the object presence.

At step 710, the method 700 may include obtaining, by the processor 244, the user input or user confirmation responsive to outputting the alert notification. At step 712, the method 700 may include causing, by the processor 244, the tailgate movement responsive to obtaining the user input.

The method 700 may end at step 714.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

15

16

That which is claimed is:

1. A vehicle comprising:

a tailgate;

a sensor system configured to capture inputs associated with the tailgate; and a processor configured to:

obtain a trigger signal;

cause a predefined tailgate movement responsive to obtaining the trigger signal;

determine a tailgate motor torque associated with the predefined tailgate movement;

estimate a tailgate weight based on the tailgate motor torque;

determine an object presence on the tailgate based on the tailgate weight being greater than a predefined tailgate weight; and prevent a tailgate movement responsive to determining the object presence.

2. The vehicle of claim 1, wherein the processor obtains the trigger signal and the inputs via a user device, a key fob or a remote user device, a tailgate actuator, a predefined user gesture or audio command, or a predefined user movement pattern in proximity to the vehicle.

3. The vehicle of claim 1, wherein the sensor system comprises at least one of a vehicle interior camera, a vehicle exterior camera, a radio detection and ranging (radar) sensor, or a light detection and ranging (lidar) sensor, and wherein the inputs comprise a tailgate image.

4. The vehicle of claim 1, wherein the processor is further configured to:

output an alert notification responsive to determining the object presence;

obtain a user input responsive to outputting the alert notification; and cause the tailgate movement responsive to obtaining the user input.

5. The vehicle of claim 4, wherein the processor outputs the alert notification via at least one of a user device, a vehicle speaker, a vehicle horn, a vehicle light, or a vehicle human-machine interface (HMI).

6. The vehicle of claim 1, wherein the tailgate is configured to move between a closed position and an open position.

7. The vehicle of claim 6, wherein the trigger signal is associated with a user request to move the tailgate to the closed position from the open position, and wherein the processor causes the tailgate movement by moving the tailgate to the closed position.

8. The vehicle of claim 6, wherein the trigger signal is associated with a user request to move the tailgate to the open position from the closed position, and wherein the processor causes the tailgate movement by moving the tailgate to the open position.

9. The vehicle of claim 1, wherein the processor is further configured to:

cause the predefined tailgate movement when the tailgate is in an open position and the trigger signal is associated with a user request to move the tailgate to a closed position;

and determine the object presence on the tailgate further based on a difference between the tailgate weight and the predefined tailgate weight being greater than a predefined threshold value.

10. The vehicle of claim 9, wherein the processor is further configured to output information associated with the difference to a user device or a vehicle human-machine interface (HMI), and wherein the difference is associated with an object weight.

11. The vehicle of claim 1, wherein the sensor system comprises an object weight detection unit disposed in the tailgate, wherein the object weight detection unit is configured to determine an object weight of an object placed on the tailgate or hung from a support rod associated with the vehicle, and wherein the processor is further configured to determine the object presence on the tailgate based on inputs obtained from the object weight detection unit.

12. The vehicle of claim 11, wherein the object weight detection unit comprises a weighing scale incorporated into a tailgate surface or a tailgate bedliner.

13. The vehicle of claim 11, wherein the object weight detection unit comprises one or more straps with strain gages attached to the tailgate.

14. The vehicle of claim 11, wherein the processor is further configured to output the object weight determined by the object weight detection unit to a user device or a vehicle human-machine interface (HMI).

15. The vehicle of claim 11, wherein the support rod comprises a hook at which the object is hung, and wherein the support rod is slidable.

16. The vehicle of claim 11, wherein the support rod comprises a demarcation or a marking at a predefined position on the support rod, and wherein the object is hung at the demarcation or the marking.

17. A method for enabling a tailgate movement, the method comprising:

obtaining, by a processor, a trigger signal;

causing, by the processor, a predefined tailgate movement of a tailgate of a vehicle, responsive to obtaining the trigger signal;

determining, by the processor, a tailgate motor torque associated with the predefined tailgate movement;

estimating, by the processor, a tailgate weight based on the tailgate motor torque;

determining, by the processor, an object presence on the tailgate based on determining that a difference between the tailgate weight and a predefined tailgate weight is greater than a threshold; and preventing, by the processor, the tailgate movement responsive to determining the object presence.

18. The method of claim 17 further comprising:

outputting an alert notification responsive to determining the object presence;

obtaining a user input responsive to outputting the alert notification; and causing the tailgate movement responsive to obtaining the user input.

19. The method of claim 17, wherein the tailgate is configured to move between a closed position and an open position.

20. A non-transitory computer-readable storage medium having instructions stored thereupon which, when executed by a processor, cause the processor to:

obtain a trigger signal;

cause a predefined tailgate movement of a tailgate of a vehicle, responsive to the trigger signal;

determine a tailgate motor torque associated with the predefined tailgate movement;

estimate a tailgate weight based on the tailgate motor torque;

determine an object presence on the tailgate based on the tailgate weight being greater than a predefined tailgate weight; and prevent a tailgate movement responsive to determining
the object presence.

* * * * *